United States Patent [19]
Gately

[11] 3,813,666
[45] May 28, 1974

[54] POWER SUPPLY MODE INDICATOR LAMP CIRCUIT

[75] Inventor: Joseph R. Gately, Woodside, N.Y.

[73] Assignee: Forbro Design Corp., New York, N.Y.

[22] Filed: Mar. 2, 1973

[21] Appl. No.: 337,299

[52] U.S. Cl. .............................. 340/248 A, 323/20
[51] Int. Cl. .............................. G08b 21/00
[58] Field of Search .......... 323/4, 9, 20, 22 T, 22 S, 323/40; 340/210, 248 A; 317/33 R

[56] References Cited

UNITED STATES PATENTS

| | | | |
|---|---|---|---|
| 3,303,411 | 2/1967 | Gately | 323/4 |
| 3,383,579 | 3/1968 | Hung | 317/33 R X |
| 3,597,676 | 8/1971 | Moore | 323/20 |
| 3,488,650 | 1/1970 | Muchnick | 340/248 A |

*Primary Examiner*—Gerald Goldberg
*Attorney, Agent, or Firm*—Alfred W. Barber

[57] ABSTRACT

Voltage and current mode indicator lamps are connected in series across the bias voltage supply of an operational amplifier. The junction between the two lamps is connected to the output terminal of the amplifier. One input is connected to a source of reference voltage and the other to the output of the error voltage amplifier. As long as the voltage amplifier is controlling the power supply output, the voltage mode lamp is on. When the control switches to current mode, the error voltage amplifier output changes and switches the voltage mode lamp off and the current mode lamp on.

4 Claims, 1 Drawing Figure

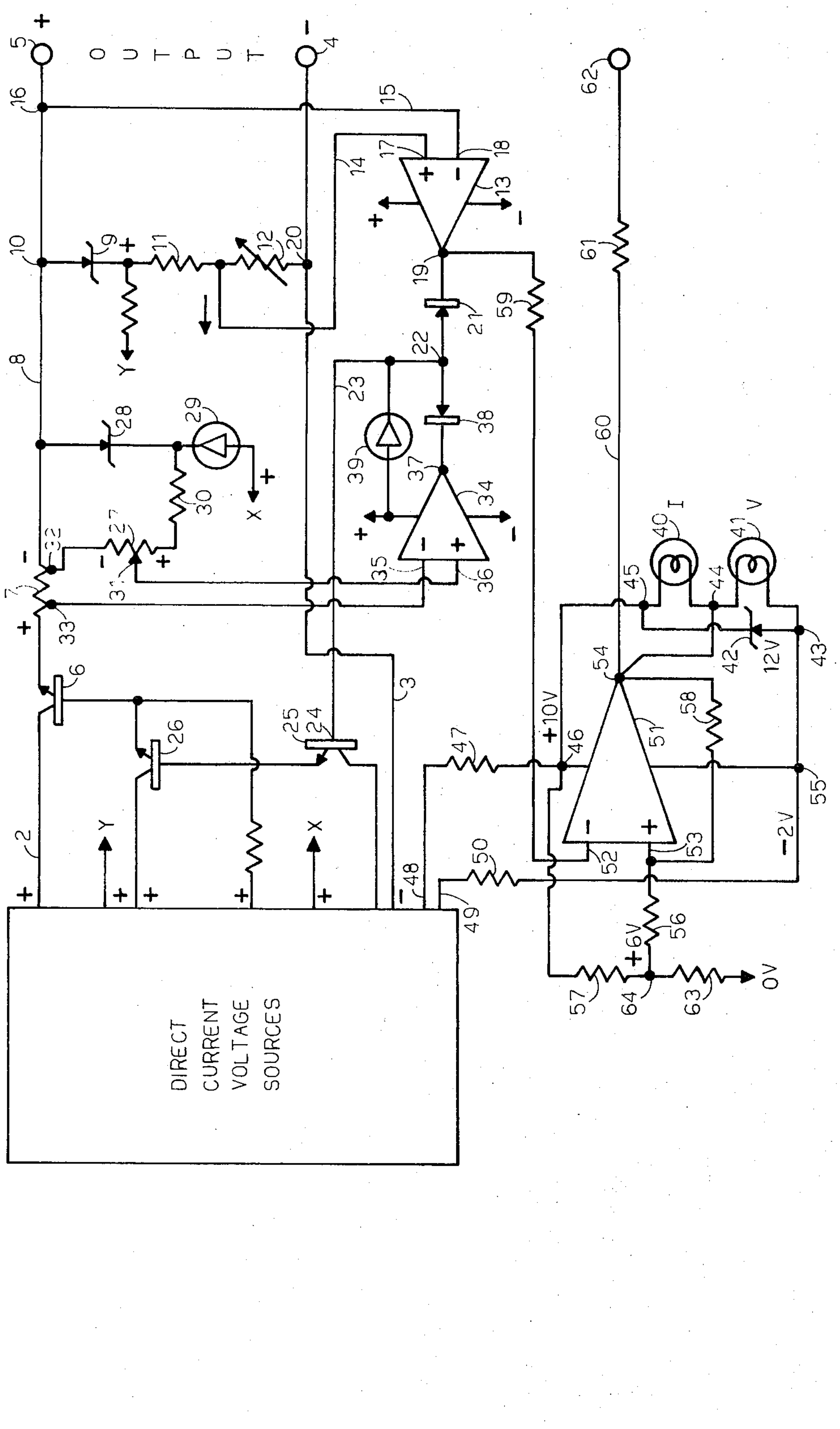
OUTPUT
DIRECT CURRENT VOLTAGE SOURCES
+10V
-2V
+6V
12V
0V

POWER SUPPLY MODE INDICATOR LAMP CIRCUIT

In voltage/current regulated power supplies, often called cross-over power supplies, lamps may be used to indicate the mode of regulation to which the output is subjected at any given instant. Such lamps are shown and described in U.S. Pat. No. 3,303,411 entitled "Regulated Power Supply with Constant Voltage/CUrrent Cross-over and Mode Indicator". The cross-over regulated power supply employs two error or control amplifiers, one to control output voltage, called the error voltage or voltage control amplifier and the other called the error current or current control amplifier. At any given instant one of these amplifiers will control the power supply output depending on the setting of the controls and the load. In order to indicate generally whether the power supply is in voltage or current regulating mode a pair of lamps are employed together with a circuit for energizing the lamps which switches in accordance with the regulating mode of energize the corresponding mode indicating lamp. In the above reference patent the circuit employed to switch and energize the lamps comprises four transistors connected in a two stage cascaded differential pair amplifier circuit. Inputs are taken from both the voltage and current control amplifiers and the outputs drive the current mode and voltage mode lamps.

I have found that a single inexpensive IC op amp can be used to switch the mode indicator lamp thereby simpifying the wiring, saving space and reducing the cost. Furthermore, the op amp has high gain and provides a very sensitive switch.

Two mode indicator lamps are connected in series between the positive and negative supply voltages of the op amp. The junction between the two lamps is connected to the output terminal of the op amp. One input (the non-inverting input) to the op amp is connected to a source of reference voltage, plus six volts for example, and the other input (the inverting input) is connected to the output of the error voltage amplifier. Positive feedback from the output to the non-inverting input provides snap action with a slight hysteresis which prevents hunting or instability around the changeover point.

In the Drawing:

The FIGURE of the drawing is a schematic circuit diagram of the preferred form of the present invention.

In the FIGURE of the drawing, block 1 represents the direct current voltage sources suitable for supplying the power to all other circuits of the voltage/current regulated power supply of the present invention. This main power source is supplied between positive line 2 and negative line 3. The negative output terminal 4 is connected directly to the common negative line 3. The positive output terminal 5 is connected to positive line 2 through pass transistor 6 and current sensing resistor 7 and over line 8.

The power supply is voltage regulated by a voltage control bridge including reference voltage zener diode 9, reference resistor 11, voltage control resistor 12 all connected in series between positive line 8 at 10 and negative line 3 at 20. The voltage control amplifier 13 having non-inverting input terminal 17, inverting input terminal 18 and output terminal 19 is connected to amplify the error voltage with non-inverting input terminal 17 connected to the junction between the reference resistor 11 and the variable voltage control resisjor 12 over lead 14, and with inverting input 18 connected over lead 15 to junction point 16 on positive line 8. Output terminal 19 is connected through steering diode 21 to gate point 22 and over lead 23 to base 24 of first driver transistor 25. Pass transistor 6 is driven by driver transistor 26 which is driven by first driver transistor 25.

Current regulation is accomplished by means of a comparison circuit. An adjustable comparison voltage across a selected portion of potentiometer 27 is provided from a reference voltage across zener diode 28 dropped through divider resistor 30. Zener diode 28 is provided wijh current through constant current source 29. For precise current sensing resistor 7 is a four terminal resistor and the voltage drop between sensing terminals 32 and 33 is compared with the voltage at adjustable terminal 31 of reference voltage potentiometer 27. This difference voltage is applied between inverting input terminal 35 and non-inverting input terminal 36 of current control operational amplifier 34. Output terminal 37 is connected through steering diode 38 to gate point 22.

The basic operation of this voltage/current regulator is accomplished by feeding a constant current to gate point 22 by means of constant current source 39. This current without any action from either the voltage or current regulators drives first driver transistor 25 into saturation over lead 23. This in turn drives driver 26 and again in turn pass transistor 6 into saturation passing full uncontrolled current over line 8 to output terminal 5. Regulation is accomplished by the action of either voltage control amplifier 13 or current control amplifier 34 conducting this current away from gate point 22 through the respective steering diode. For example, if the voltage control circuit calls for a reduction in output voltage, amplifier 13 provides a conductive path at output terminal 19 draining just enough of the constant current supplied a gate point 22 through steering diode 21 to reduce the drive on transistors 25, 26 and 6 until the desired reduced output voltage is achieved. If the current is higher than called for by the current control circuit, place at the output terminal 37 of the current control amplifier and through steering diode 38 until the drive is reduced and the desired output current is provided. The operation of the system as so far described is normal and conventional. The essence of the present invention is the manner in which the mode indicator lamps are operated from this convention voltage/current cross-over regulator.

Describing the operation of the mode indicator lamps 40 and 41. These lamps are connected in series between junction point 46 and junction point 55. Operational amplifier 51 has an inverting input terminal 52, a non-inverting input terminal 53 and an output 54. Positive bias for the amplifier is derived from junction point 46 which is connected to a source of positive supply voltage 48 through dropping resistor 47 and negative bias is derived from junction point 55 connected to a source of negative supply voltage 49 through dropping resistor 50. These voltages with plus and minus 12 volts at supply points 48 and 49 are plus and minus six volts respectively. It will now be seen that if amplifier 51 is programmed so that output terminal 54 saturates in a positive direction, junction 44 between lamps 40 and 41 being connected to output terminal 54, the voltage drop across lamp 40 will be substantially zero or at least very small and the voltage across lamp 41 will be substantially the total voltage between junction points 46 and 55. This voltage is limited to a predetermined voltage, say 12 volts, by zener diode 42 connected between junction points 45 and 43. Similarly, if amplifier 51 is programmed so that output terminal 54 saturates in a negative direction, junction 44 will go negative to substantially the voltage of negative supply junction point 55. The voltage across lamp 41 will become very small and that across lamp 40 will be the full voltage drop across zener diode 42. Thus, in the first case, lamp 41 will be turned on and lamp 40 will be turned off and in the second case, lamp 40 will be turned on and lamp 41 will be turned off.

Now, non-inverting input terminal 53 is maintained at a predetermined intermediate voltage, for example, plus 6 volts by a divider comprising resistors 57 and 63 connected between positive supply junction point 46 and a suitable point of zero reference voltage. Junction point 64 maintained at this intermediate voltage is connected to non-inverting input terminal 53 through resistor 56. It will be seen that if inverting input terminal 52 receives a voltage less positive than the bias on non-inverting input terminal 53 as described above, output terminal 54 will saturate in a positive direction energizing lamp 41. This is the condition which pertains while voltage control amplifier 13 is controlling the output voltage of the power supply. Output terminal 19 while controlling will be maintained at some low voltage typically around plus two volts and substantially les positive than the plus six volts on terminal 53. Lamp 41 will then be the voltage mode lamp andwill be turned on.

Now, if the current control amplifier 34 takes control of the utput current, and output terminal 37 goes to a low voltage, voltage control amplifier must then lose control and output terminal 19 will go to a high positive voltage. This high positive voltage will be substantially that of the positive bias supply of the amplifier say 10 – 12 volts and well above the positive voltage of terminal 18. With terminal 52 more positive than terminal 53 the output terminal 54 of amplifier 51 will go to negative saturation, substantially the voltage of junction point 55, and lamp 40, the current mode lamp, will be turned on and lamp 41 will be turned off. In this way voltage mode lamp 41, when turned on, indicates that the power supply is in voltage regulating mode and current mode lamp 40, when turned on, indicates that the power supply is not in voltage regulating mode but is actually in current regulating mode. The change over takes place when the regulating mode changes as evidenced by the condition of the output of the voltage control amplifier.

In order to provide a snap-action to the mode lamp change over and prevent any ambiguity or flickering of the lamps, a positive feed-back is provided by means of resistor 58 connected between output terminal 54 and non-inverting input terminal 53.

While the circuit shows and the description covers a mode lamp control cued from the output of the voltage control amplifier, the circuit may be operated in other ways as by being cued from the current control amplifier or in another mode as being cued from both amplifiers.

I claim:

1. In a mode indicator for cross-over power supplies, the combination of;

an operational amplifier utilizing a source of positive bias and a source of negative bias and including an inverting input terminal, a non-inverting input terminal, and an output terminal;

a source of positive bias for said amplifier;

a source of negative bias for said amplifier;

two indicator lamps connected in series and bridged across said positive and negative bias sources;

a connection between said output terminal and the junction between said lamps;

a source of signal characterized by a significant change in response to the change of mode to be indicated connected to one of said input terminals;

and a source of refernce voltage connected to the other of said input terminals.

2. A mode indicator as set forth in claim 1, and including;

positive feedback means connected between the output of said amplifier and said non-inverting terminal.

3. A mode indicator as set forth in claim 1, and including;

a zener diode connected across both of said lamps.

4. A mode indicator as set forth in claim 1;

wherein said source of signal is one of the control amplifiers in the cross-over power supply.

* * * * *